United States Patent [19]
Ibbotson

[11] 3,947,922
[45] Apr. 6, 1976

[54] FOUNDATIONS FOR CARD CLOTHING

[75] Inventor: Peter Ibbotson, Liversedge, England

[73] Assignee: The English Card Clothing Company Limited, Yorkshire, England

[22] Filed: Jan. 15, 1973

[21] Appl. No.: 323,652

[30] Foreign Application Priority Data
Jan. 29, 1972 United Kingdom............. 4267/72

[52] U.S. Cl. ............... 19/114; 427/387; 427/390; 427/407; 427/412; 428/425; 428/447

[51] Int. Cl. .................................... D01g 15/84

[58] Field of Search ......... 117/72, 139.5 A; 19/113, 19/114; 427/387, 390, 407, 412

[56] References Cited
UNITED STATES PATENTS

| | | | |
|---|---|---|---|
| 1,731,148 | 10/1929 | Otto...................................... | 19/114 |
| 2,340,069 | 11/1944 | McCarthy et al..................... | 19/114 |
| 2,488,442 | 11/1949 | Snape .................................... | 19/114 |
| 3,058,168 | 10/1962 | Laroche................................. | 19/114 |
| 3,290,729 | 12/1966 | Maynard................................ | 19/114 |
| 3,463,660 | 8/1969 | Bentley et al......................... | 117/72 |
| 3,607,360 | 9/1971 | Elmer .................................... | 117/72 |
| 3,737,953 | 6/1973 | Bechtel................................. | 19/113 |

OTHER PUBLICATIONS

B. Golding, Polymers and Resins Their Chemistry and Chemical Engineering (1959), pp. 347 & 348, Van Nostrand Co.

*Primary Examiner*—Ralph Husack
*Attorney, Agent, or Firm*—Norris & Bateman

[57] ABSTRACT

A card clothing foundation, to which the carding wires are fitted, has an anti-friction surface layer of polyurethane about 0.006 inch in thickness and containing silicone.

2 Claims, 2 Drawing Figures

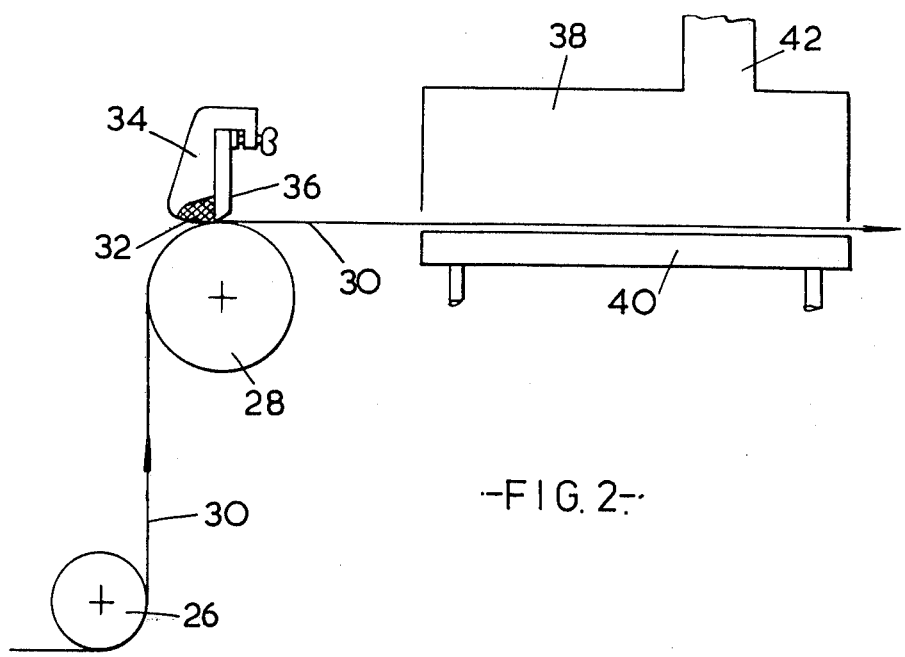
-FIG. 2-

FOUNDATIONS FOR CARD CLOTHING

It is a drawback of the textile carding process that fibres and waste matter tend to remain in the wires of the card-clothing, necessitating periodical cleaning of the card-clothing. This problem has become more acute because it is expensive to leave a machine idle whilst it is being cleaned or fettled.

It has been found that fibre retention can be reduced if the exposed surface of the card-clothing foundation is treated to provide an anti-friction or release surface, and this forms the essential feature of the invention. Since the exposed surface will become roughened due to wear and will have to withstand fettling combs and the abrasion due to fibres, it is preferable that the surface treatment shall produce a hard wearing anti-friction surface.

A suitable treatment is the coating of the foundation with a layer of material which includes a silicone. Preferably a layer of polyurethane compound with a silicone is coated on to or impregnated into a fabric or plastics foundation layer.

The invention is based on the appreciation of the apparent fact that fibre retention is in part due to the fibres adhering to the exposed surface of the foundation. It is then found that by treating the foundation to provide a surface with a lower co-efficient of friction relatively to fibres, that there is less tendency for the fibres to be retained in the card-clothing and of course, this reduces the required frequency of fettling.

Two methods of manufacturing card-clothing foundation in accordance with the invention will now be described, by way of examples only, with reference to the accompanying drawings, in which:

FIG. 2 is a diagram showing an alternative process.

Figure 1:
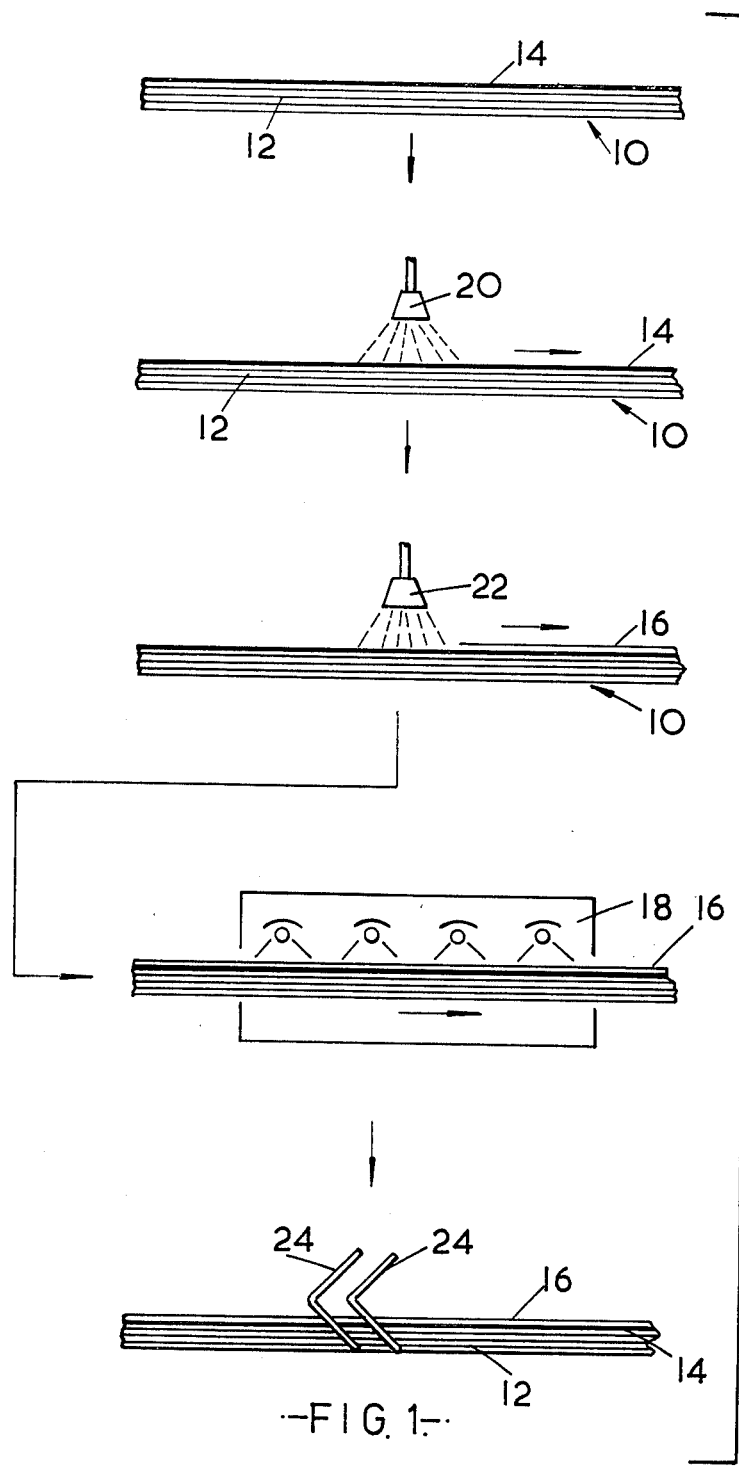
FIG. 1 is a flow diagram illustrating various stages in the process.

In the first method, a conventional foundation 10 is prepared, this foundation consisting of a laminate of woven linen and woven cotton layers 12 bonded together with vulcanised india rubber. It is to be understood that the foundation could be made from other material, including leather and plastics sheets, but it is preferred to use the woven laminate as shown in the drawing.

The foundation has an exposed face layer 14 of acrylonitrile fabric which is bonded to the other layers in the manufacturing process. A tie coating of isocyanate is first applied to the acrylonitrile face layer 12 by conventional methods, such as coating by a spray 20, and this is followed by the application of a layer 16 of polyurethane, which may be applied in liquid form by spraying as shown at 22, or it may be applied in sheet form laid on the isocyanate tie layer when the latter is tacky.

The polyurethane layer 16 is an important feature of the invention and it incorporates a compatible silicone release agent. The release agent has the property of providing an anti-friction surface to which fibres, grease, burrs and the like cannot easily adhere. The release agent should provide a less adhesive surface than the conventional surface materials such as leather, vulcanised fabrics and plastics.

The surface coating 16 of polyurethane with its silicone release agent can be quite thin (e.g. 0.006 inch in thickness).

After application of the polyurethane layer 16, the foundation passes through a drying tunnel 18, and it is then possible to fit the carding wires 24 in the usual manner. The polyurethane provides a hard-wearing surface which is not easily damaged or worn away, and consequently, the release surface can be maintained for a long period.

Referring now to FIG. 2, there is shown an alternative method of applying the layer of polyurethane incorporating the silicone release agent. The starting material is the conventional foundation, which may be given a tie coating of isocyanate if required. The foundation then passes over guide rollers 26 and 28 following the path indicated by the line 30.

The polyurethane 32 containing silicone is applied in a plastics state or by a drip feed or automatically between two end runners 34 (which determine the width of the applied layer of material) and a doctor knife 36 is set to produce the required thickness of polyurethane on the surface of the foundation.

After application of the polyurethane, the foundation travels through a drying chamber 38 heated by a steam chest 40 where the surface coating is cured. The chamber 38 is vented at 42.

I claim:

1. A card clothing foundation having a surface that is exposed during carding and having teeth projecting from that surface during carding and an anti-friction covering for reducing the retentivity of waste and fiber at said surface consisting essentially of a relatively thin carrier layer of hard wear resistant polyurethane in which a compatible silicone is incorporated.

2. A card clothing as defined in claim 1, wherein said layer of polyurethane is in the order of 0.006 inch in thickness.

* * * * *